H. ALWIES.
STREET OR STATION INDICATOR.
APPLICATION FILED NOV. 26, 1909.
964,835.
Patented July 19, 1910.
8 SHEETS—SHEET 1.
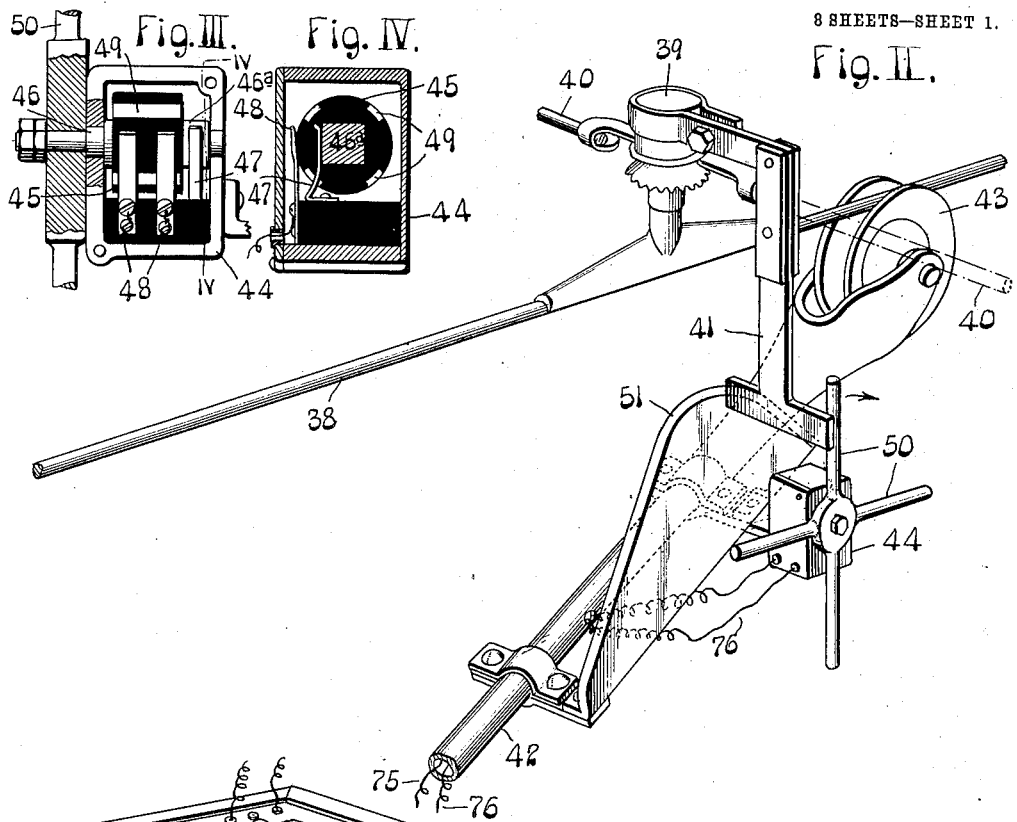
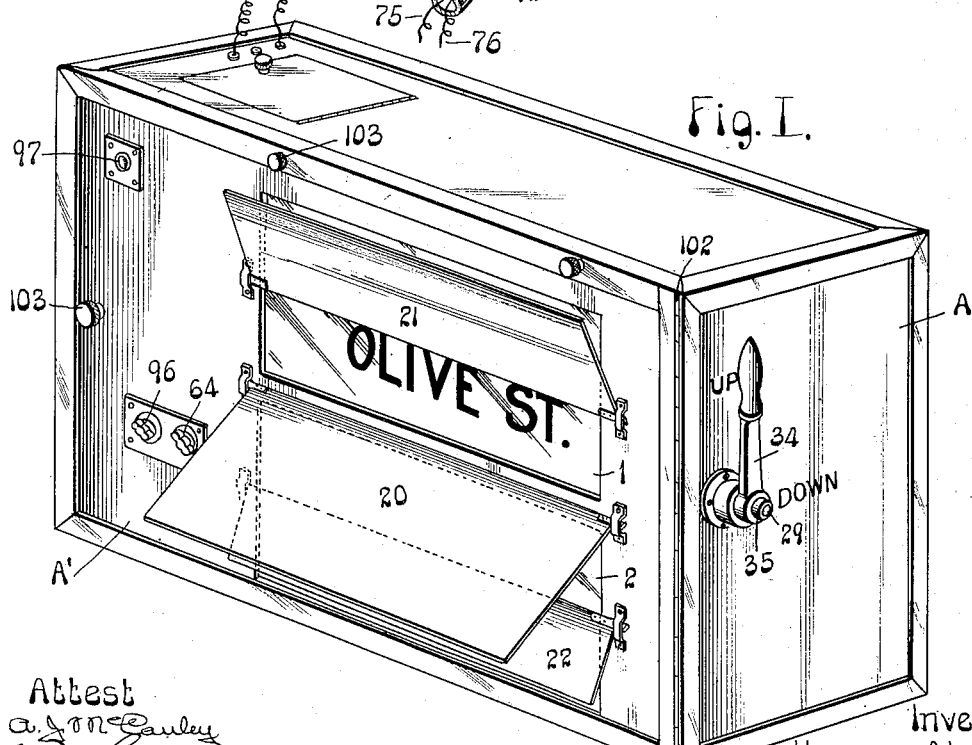
Attest
a. J. McCauley
E. B. Linn
Inventor
Herman Alwies
by E. J. Smith Atty.

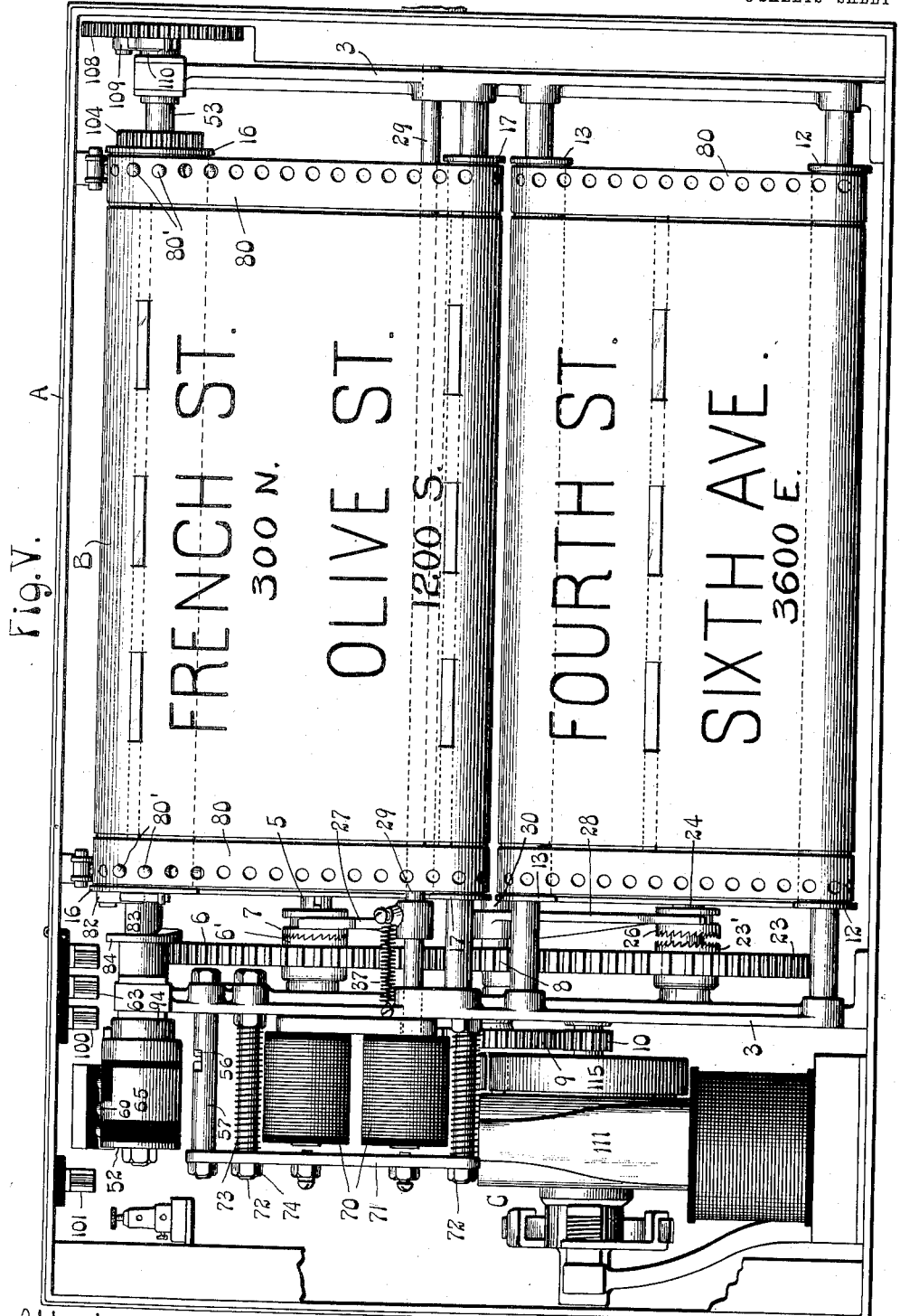

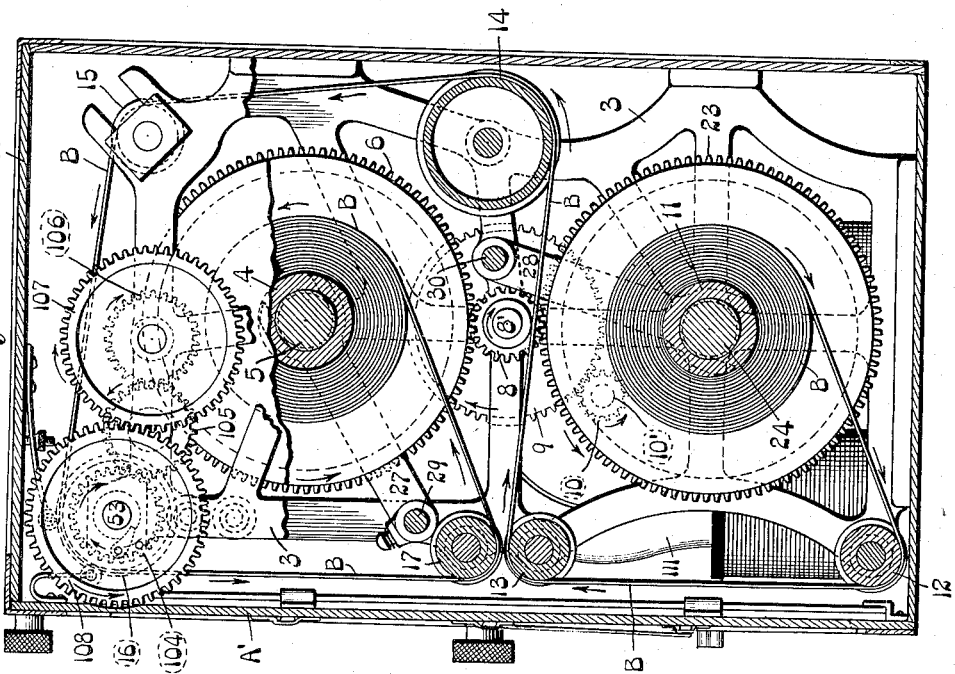

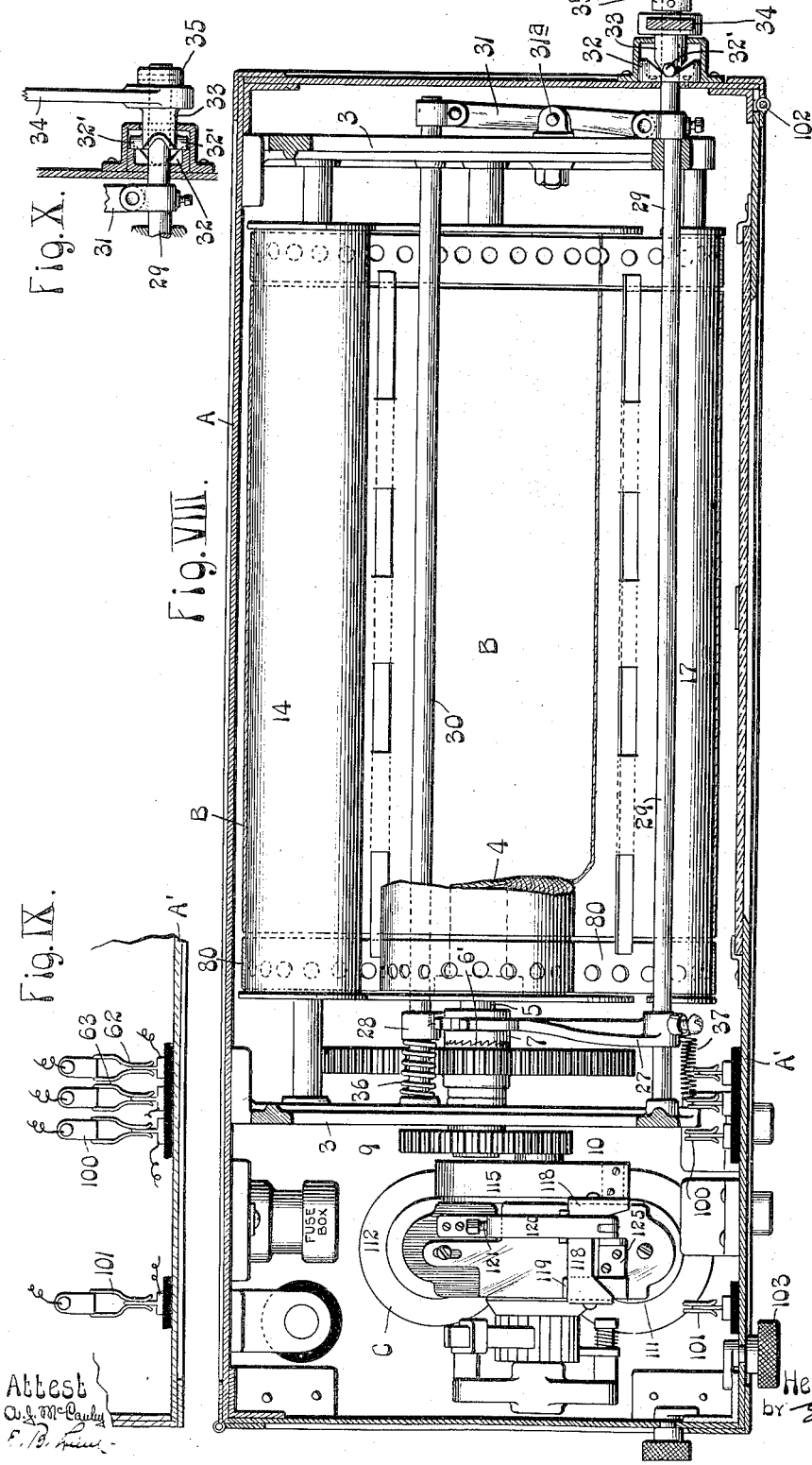

H. ALWIES.
STREET OR STATION INDICATOR.
APPLICATION FILED NOV. 26, 1909.
964,835.
Patented July 19, 1910.
8 SHEETS—SHEET 5.
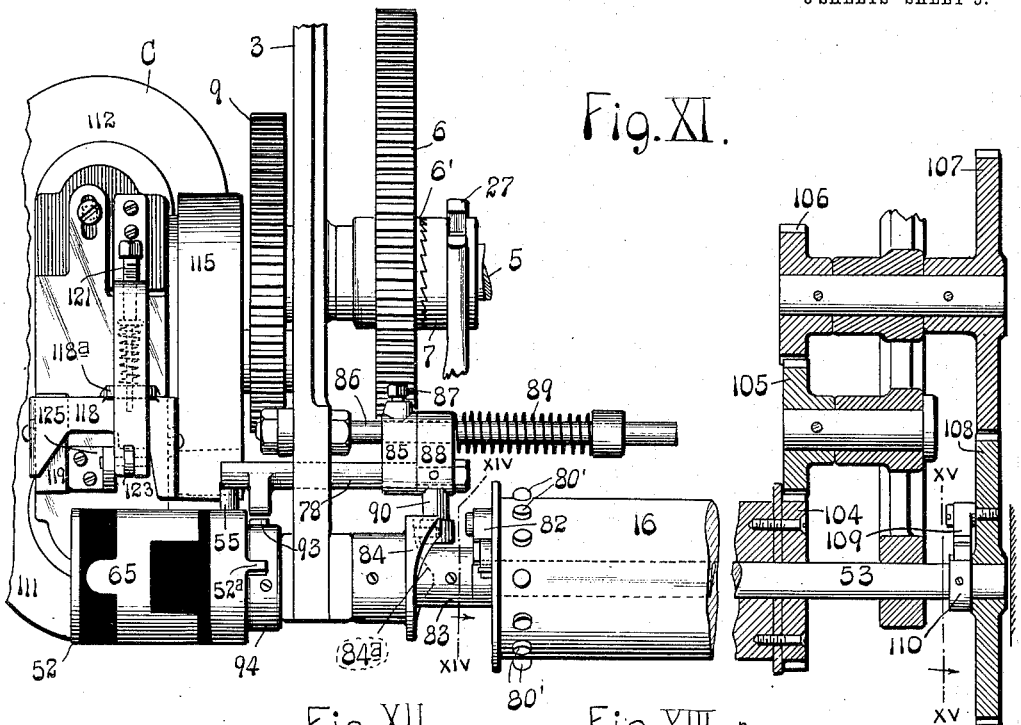
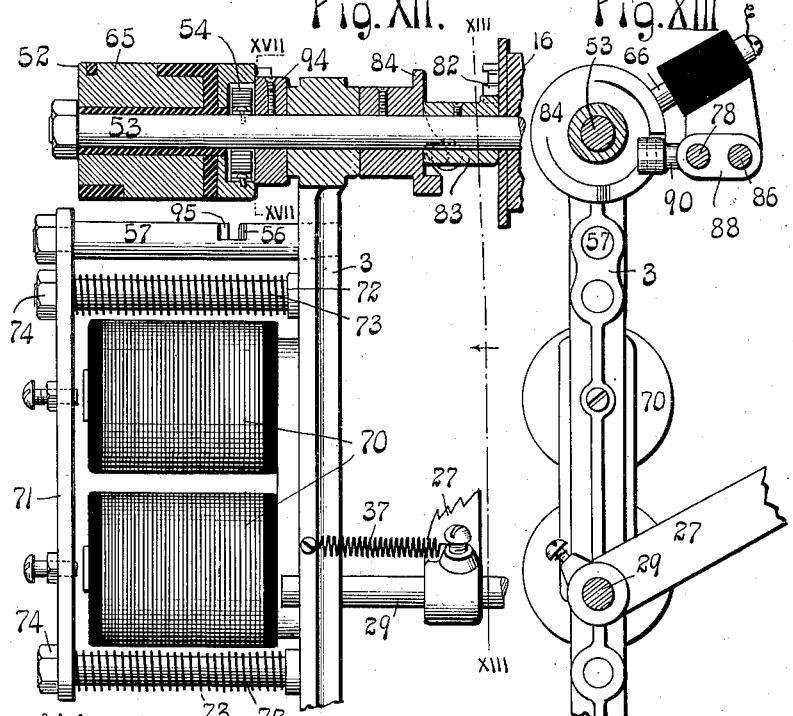
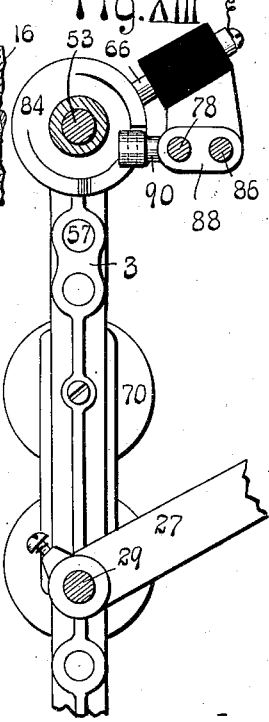
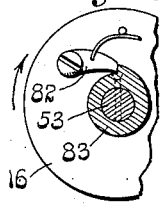
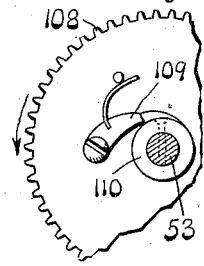
Attest
Inventor:
Herman Alwies

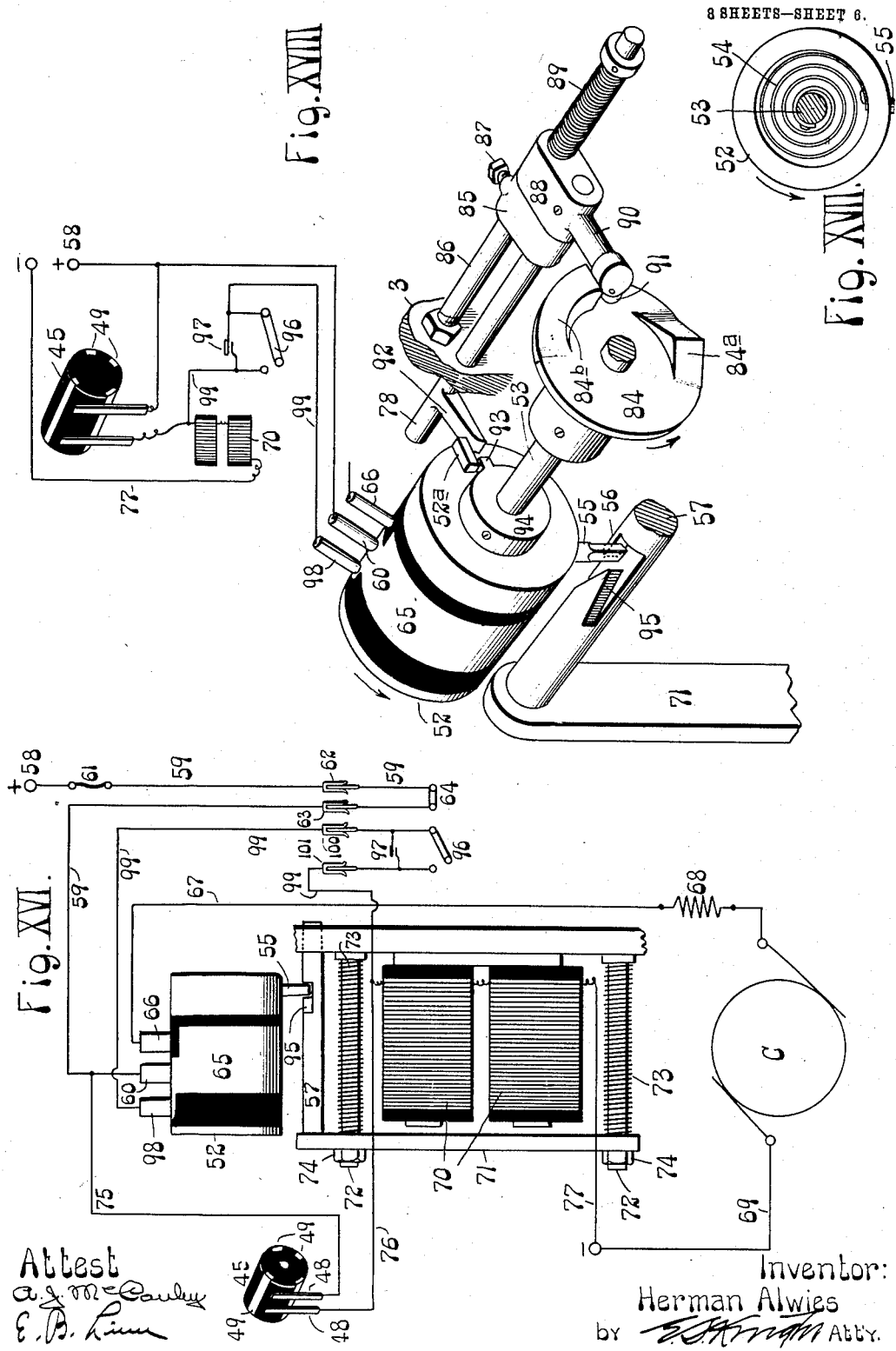

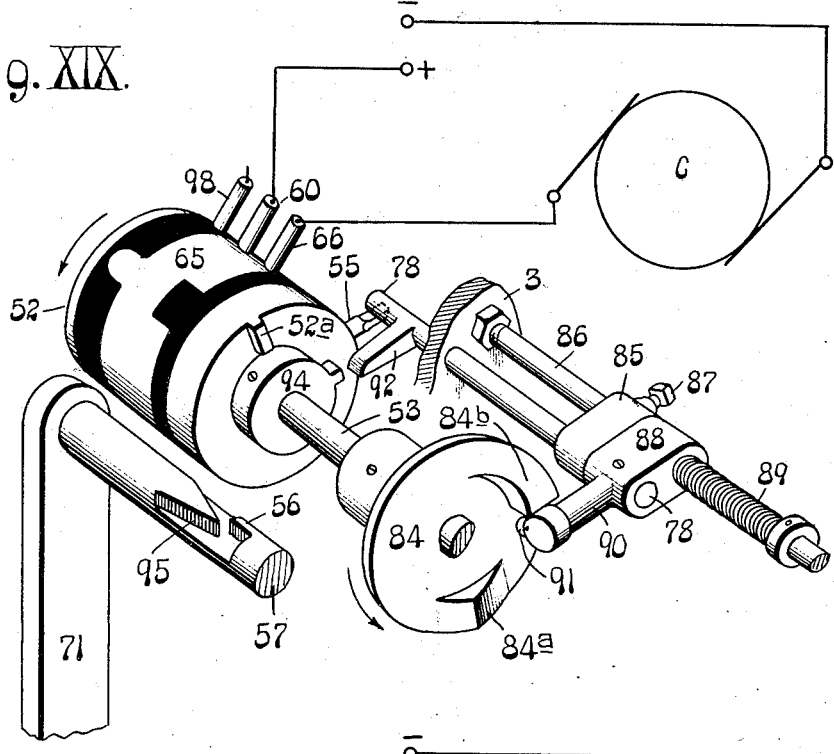
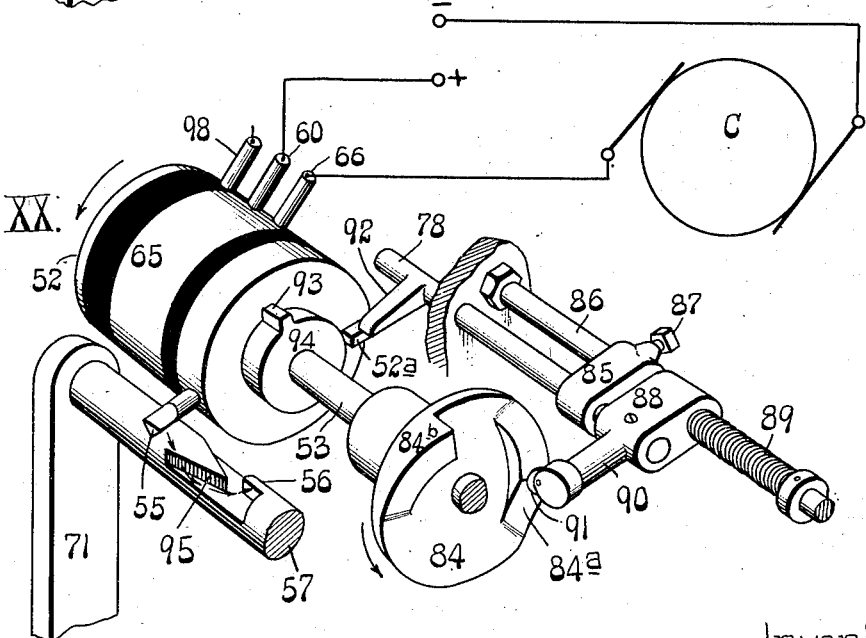

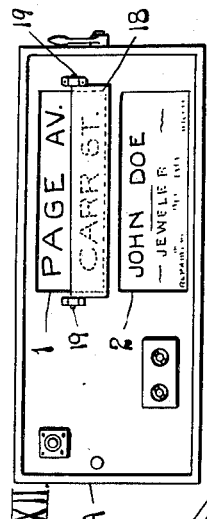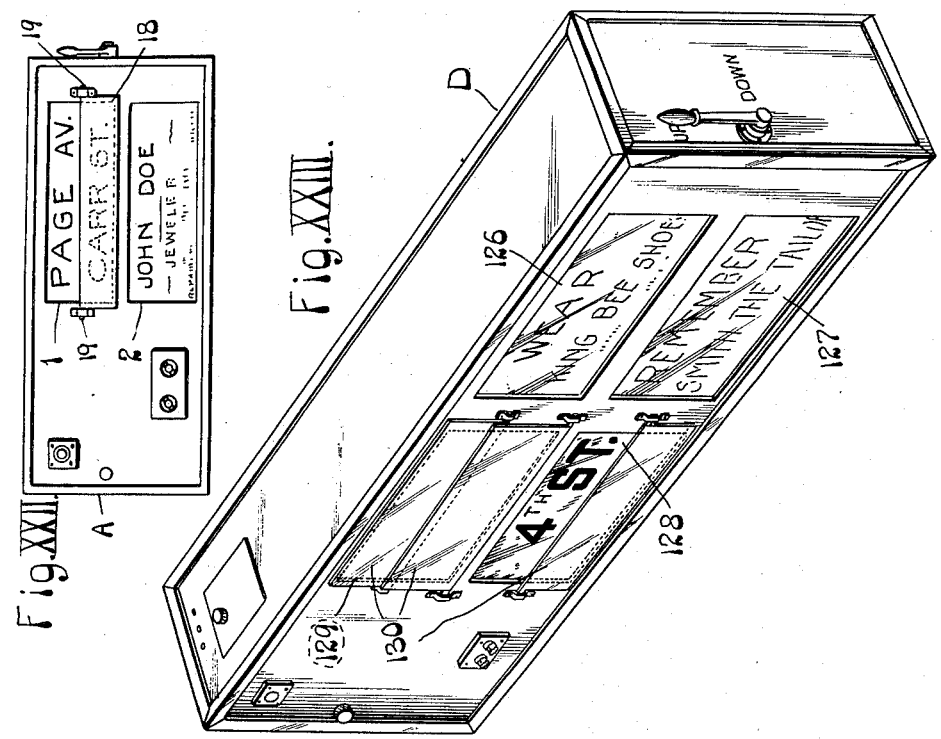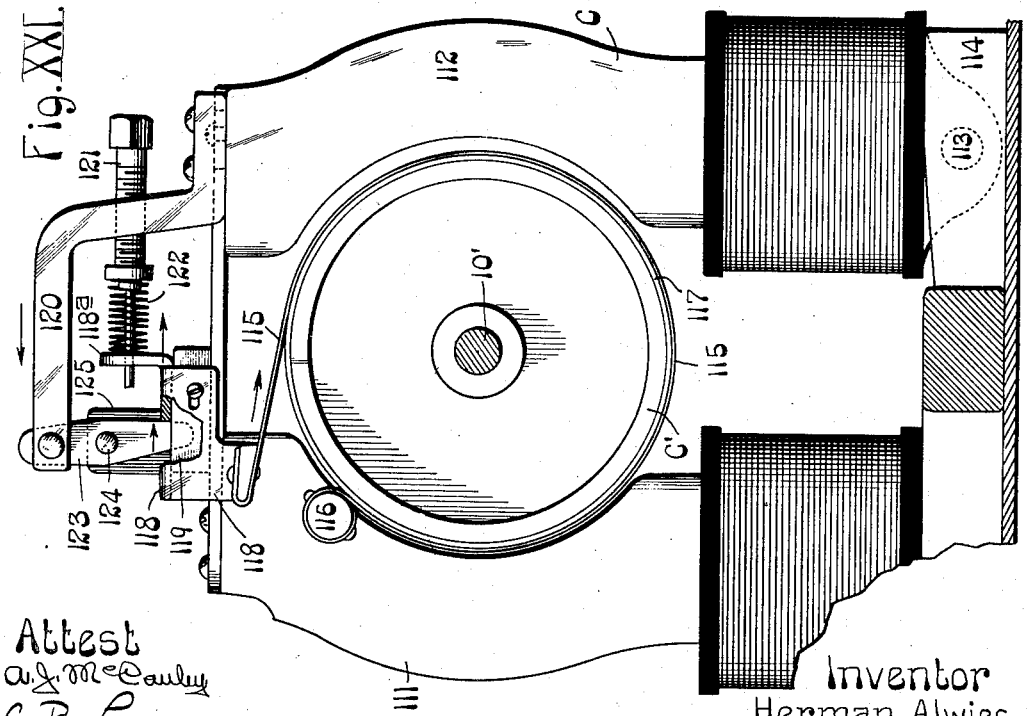

UNITED STATES PATENT OFFICE.

HERMAN ALWIES, OF ST. LOUIS, MISSOURI.

STREET OR STATION INDICATOR.

964,835.

Specification of Letters Patent.

Patented July 19, 1910.

Application filed November 26, 1909. Serial No. 529,875.

*To all whom it may concern:*

Be it known that I, HERMAN ALWIES, a citizen of the United States of America, residing in the city of St. Louis and State of Missouri, have invented certain new and useful Improvements in Street or Station Indicators, of which the following is a full, clear, and exact description, reference being had to the accompanying drawings, forming part of this specification.

This invention relates to certain new and useful improvements in electric automatic street and station indicators and is designed more particularly as an improvement upon the class of automatic electric street or station indicators described and claimed in my application for Letters Patent, filed Aug. 10, 1896, Serial No. 602,354.

The object of the present invention is to accomplish in a much simpler and positive way the result of the invention referred to, and also greatly to economize in the amount of space occupied by the mechanism.

Another object of this invention is, as in the invention referred to, to construct a street and station indicator which is carried on the car and which is automatically and electrically operated from the current of the line wire, or the light wire, forming a continuation thereof.

Figure I is a perspective view of my improved street or station indicator. Fig. II is a perspective view of a switch controlling mechanism which controls the operation of said indicator. Fig. III is a vertical section of the switch shown in Fig. II. Fig. IV is a section taken on line IV—IV, Fig. III. Fig. V is a front view of the sign sheet and its operating mechanism, the front wall of the housing being removed. Fig. VI is an end view with the lefthand end wall of the housing removed. Fig. VII is an end view with the righthand end wall removed, the lower portion of said view being in section. Fig. VIII is a plan view, the housing being shown in section. Fig. IX is a detail view of a portion of the mechanism shown in Fig. VIII. Fig. X is a horizontal section of a portion of the reversing mechanism. Fig. XI is in part a plan view, and in part a section of the switch in the sign, and means for operating and governing it. Fig. XII is a front view partly in section, illustrating a portion of the mechanism shown in Fig. XI. Fig. XIII is a section taken on line XIII—XIII, Fig. XII. Fig. XIV is a section taken on line XIV—XIV, Fig. XI. Fig. XV is a section taken on line XV—XV, Fig. XI. Fig. XVI is a complete diagram view illustrating electrical devices used in connection with this invention. Fig. XVII is a section taken on line XVII—XVII, Fig. XII. Figs. XVIII, XIX, and XX are diagrammatic views. Fig. XXI is a detail view of a motor and the brake for stopping same. Fig. XXII is a front view. Fig. XXIII is a perspective view illustrating a slightly modified form of sign.

A indicates a housing having display openings 1 and 2, each of said openings being of substantially the same height.

B is a sign sheet preferably of cloth, upon which the names of streets or stations are arranged. This sign sheet is moved step by step by mechanism which includes an electric motor C.

3 indicates frames which support rollers for actuating the sign sheet. When the parts occupy the position shown in the drawings, a roller 4 secured to a shaft 5 constitutes the winding spool for the sign sheet (see Fig. VII). A gear wheel 6, loosely mounted on the shaft 5, is engaged with a clutch member 7, the latter being splined to said shaft.

8 indicates a pinion meshing with the gear wheel 6, (Figs. V and VII) and secured to a shaft 8′ upon which a gear wheel 9 is mounted. The winding spool 4 is operated by a pinion 10 on the armature shaft 10′ of the motor C, the latter actuating the train of gearing just described. In passing from the supply spool 11 to the winding spool 4, (see Fig. VII) the sign sheet B passes over rollers 12, 13, 14, 15, 16 and 17 in the order named. By referring to Figs. I, VII and XXII, it will be seen that the path taken by the sign sheet locates one side thereof opposite the display opening 1, and its opposite side in alinement with display opening 2. One advantage of this construction is that it enables both sides of the sign sheet B to be utilized as display mediums. If desired, one side of sheet B may be provided with advertising signs, while two sets of street or station signs are displayed on the opposite side thereof, as shown in Fig. XXII.

During each operation of the machine, the sign sheet B moves a distance substantially equal to the height of the display opening 1, and the motor is then stopped by mechanism which will be hereinafter described. It will be seen that the name of one street on each set of signs is alined with opening 1, the set which includes, as in the example, "Carr st.," being covered by the hinged door 18. By causing the sign sheet B to move at each operation a distance substantially equal to the height of opening 1 and rendering one set of signs ineffective by the door 18, the machine may be used on a car which operates over two different routes. When it is desired to bring the signs which include the words "Carr st." into service, it is only necessary to swing the door 18 upwardly on its pivot pins 19 so as to close the upper part of opening 1 (Fig. XXII) and open the lower portion thereof.

In Fig. I, I have shown hinged doors 20, 21 and 22 which are adapted to close, or partially close, openings 1 and 2. It will now be readily understood that when this latter structure is employed, each side of the sign sheet B can be provided with two sets of street or station indicating signs. For the purpose of more clearly illustrating the door construction, I have shown the doors 20, 21 and 22 partially open in Fig. I, but wish it to be understood that these doors normally lie against the housing A and thereby allow only one-half of one of the display openings to be displayed.

The direction of travel of the sign sheet may be reversed by mechanism which will now be described. The pinion 8, (see Figs. V and VII) which is driven by the motor, meshes with the gear wheel 23 loosely mounted on a shaft 24, the roller 11 being secured to said shaft. A clutch member 23' carried by the gear wheel 23 is adapted to be engaged by a clutch member 26, the latter being splined to shaft 24. By moving the clutch member 7 out of engagement with the clutch member 6', and engaging the clutch member 23' with the clutch member 26, the gear wheel 23 will cause shaft 24 to revolve whenever the motor is operated. This action will cause the spool 11 to serve as the winding member, allowing the sign sheet to unwind from the spool 4, and thereby cause said sheet to travel in a direction opposite to that indicated by the arrows in Fig. VII. The clutch members 7 and 26 are operated respectively by bifurcated arms 27 and 28, said arms being secured to rods 29 and 30 slidingly mounted in the frames 3.

31 indicates a lever (see Fig. VIII) pivoted at 31ᵃ to the frame 3, and having its ends pivotally connected to collars on the rods 29 and 30, respectively. The function of the lever 31 is to connect rods 29 and 30 so as to cause one of the clutches to be in operative position only when the other clutch is out of engagement with its co-acting clutch member.

32 indicates a stationary cam (see Figs. VIII and X) secured to the end wall of the housing A, and 32' indicates pins carried by a sleeve 33, the latter being loose on rod 29, and rigidly secured to a handle 34. A collar 35 is secured to the end of the rod 29.

To reverse the movement of the sign sheet B, it is only necessary to rock the handle 34 to a point opposite the word "Down" in Fig. I, this action causing pins 32' to ride up the inclined faces of the cam 32 and occupy the position shown in Fig. X. While the pins 32' are moving up the inclined faces, the rods 29 and 30 move in opposite directions against the resistance offered by the springs 36 and 37. The rod 29 pulls the clutch operating arm 27 toward the right-hand end of the machine, and the rod 30 moves the clutch operating arm 28 toward the lefthand end of the machine.

I will now describe the means for energizing the motor and allowing it to operate intermittently so as to advance the sign sheet step by step.

38 indicates a line wire of a street railway system, (see Fig. II) said wire being provided with the usual insulators 39 to which supporting wires 40 are secured. Brackets 41 are fastened to the insulators 39 at suitable points along the line. 42 and 43, respectively, indicate the usual trolley pole and wheel. 44 indicates a housing connected to the pole 42 and inclosing a switch 45 mounted on a shaft 46. The shaft 46 is provided with a non-circular portion 46ᵃ with which a spring 47 coöperates.

48 indicates springs which engage the switch member 45 and contact with one of the metallic strips 49 when said member 45 is turned one-fourth of a revolution. When the car passes a bracket 41, one of the arms 50 engages said bracket and causes the switch member to turn one-fourth of a revolution. During this operation of the switch member, the contact springs 48 are electrically connected together by one of the metallic strips 49, and this electrical connection completes a circuit that energizes a switch operating mechanism which will be hereinafter described.

51 indicates a plate secured to the trolley pole 42, the highest point on said plate being above the top of the vertical arm 50. The function of the plate 51 is to prevent the arms 50 from being operated by the supporting wires 40 when the trolley wheel is accidentally thrown from the line wire 38. It is, of course, understood that when the wheel 43 is thrown out of contact with the wire 38, the pole tends to assume a vertical position and engage the supporting wires 40. When the pole is in this abnormal position and a car passes under a supporting wire 40, the pole is depressed by the plate 51 which rides under said wire, and thus locates the arms 50 out of alinement therewith.

52 indicates a revoluble switch or commutator mounted on the shaft 53 within the indicator housing A, and connected thereto by a spiral spring 54, shown in Figs. XII and XVII. The spring 54 is always under tension and tends to revolve the switch 52 in a direction indicated by the arrow in Fig. XVII. The switch 52 is normally prevented from revolving by a pin 55 which engages a shoulder 56 on a slidable rod 57. While the motor is operating, current supplied at 58, (see Fig. XVI) passes through a conductor 59 to a brush 60, portions of said conductor being formed by a fuse 61 and switches 62, 63 and 64. When this circuit is closed, the current passes from the brush 60 through a conductor 65 to the brush 66, and then flows through a conductor 67, resistance coil 68, the motor C, and then returns to the source of energy through a conductor 69. When the switch occupies its normal position, current cannot flow through the conductors just described because the brush 66 is insulated from the conductor 65, (see Figs. XVI and XVIII). To release the pin 55 and allow the spring 54 to operate the switch 52, the following mechanism is brought into service.

70 indicates electro-magnets secured to the frame 3 and adapted to operate a bar or armature 71. The bar 71 is loosely mounted on rods 72 and held in the position shown by means of springs 73, the latter forcing said bar against nuts 74. The rod 57 which serves as a stop for the pin 55 is slidingly mounted in frame 3 and secured to bar 71. When the switch 45 is rocked by an arm 50, the contact springs 48 are temporarily connected together by the metal strip 49, and current supplied at 58 passes through the conductors 59 and 75, spring contacts 48, conductor 76, magnets 70, and from thence to the return wire 77. This energizes the magnets 70 and causes them to pull the bar 71 and rod 57 to the left, thereby releasing the pin 55 and allowing the spring 54 to rock the switch 52 to a position shown in Fig. XIX. The switch is temporarily held in this latter position by the pin 55 which engages a rod 78. The parts herein shown are so timed that the shaft 53, upon which the switch 52 is mounted, makes one complete revolution during each operation of the machine. For the purpose of driving shaft 53, the roller 16 mounted on said shaft is provided with teeth 80′ that mesh with bands 80 that may be perforated tapes of metal, cloth, or other suitable material, or chains. The bands 80 are connected to each other and to the sign sheet by means of metal strips which pass through the sign sheet and have their ends soldered or otherwise suitably secured to the bands 80. The sign sheet being connected to the bands 80, the roller 16 is therefore positively driven at each operation of the machine. The roller 16 is loosely mounted on the shaft 53 and provided with a spring pressed pawl 82 (see Figs. XI and XIV,) which coöperates with the toothed collar 83, the latter being fastened to the shaft 53. It will now be understood that the shaft 53 is driven by the roller 16, and while said shaft is revolving, it stores up energy in the spring 54 which operates the switch 52. When the switch is released by the magnets 70, the motor starts to revolve, and said switch occupies the position shown in Fig. XIX until again released by the action of a cam 84. The rod 78 passes through a frame 3 and is slidably mounted in the stop member 85, said stop member being secured to the rod 86 by means of a set screw 87. A cross head 88 rigidly secured to the rod 78 is slidingly mounted on the rod 86 and normally held against the stop 85 by a spring 89. The cross head 88 is provided with an arm 90 having a roller 91 which rides on the cam 84. The cam 84 is secured to the shaft 53, and therefore revolves in the direction indicated by the arrow in Fig. XIX while the motor is operating. When the cam projection $84^a$ passes the roller on the arm 90, the rod 78 is moved to the right, this action releasing the pin 55 and allowing the spring 54 to turn the switch 52 until the lug $52^a$ engages a finger 92 on the rod 78. The parts then occupy the position shown in Fig. XX, the motor circuit remains closed and the cam shaft 53 continues to revolve and store up energy in the spring 54 while the switch 52 remains stationary. When the shaft 53 is turned almost one complete revolution, the cam actuated arm 90 is moved to the right by the cam projection $84^b$. This action causes the rod 78 to move to the right, and thus disengages the finger 92 from the lug $52^a$. The switch 52 then rotates until stopped by the shoulder 56 which coöperates with the pin 55. The parts now occupy their normal positions, (see Fig. XVIII) wherein the motor circuit is open, the switch locked against rotation by the pin 55, and the shaft 53 positively stopped in its normal position by the lug 93 which engages the lug $52^a$. The lug 93 is preferably formed integral with the collar 94, the latter being secured to the shaft 53.

If the switch 45 which controls the magnetic circuit should accidentally stop in its closed position, the magnets will remain energized but the machine will be prevented from making more than one operation by the following parts: The rod 57 is provided with a shoulder 95 on its upper face, the end of said shoulder being substantially in alinement with the shoulder 56. While the magnets 70 are energized, the rod 57 is in such a position that the shoulder 95 is located in the path of the pin 55. Therefore, if the magnets are energized when the switch completes a revolution, the pin 55 will engage the shoulder 95, stop the switch, and thereby close the motor circuit.

It is sometimes desirable to actuate the device by operating a switch convenient to the operator. For this purpose, I provide a switch 96 and a push button 97, (see Figs. I, XVI and XVIII). The closing of this switch will allow current supplied at 58 (see Figs. XVI and XVIII) to flow to the brush 60, through the conductor 65 to the brush 98, and then pass through the wire 99 to the magnets 70, and return to the source of energy through the wire 77.

One member of each of the knife switches 62, 63, 100 and 101 is secured to the top wall of the housing A, (see Figs. VI, VIII, IX and XVI) its coöperating switch member being secured to the front wall A' of said housing. The wall A' is preferably hinged at 102 to the housing A (see Fig. I) and provided with lock members 103. The object of locating the knife switches so as to cause them to be operated by the hinged front wall is to cause all of the circuits to open automatically when the door A' is opened for the purpose of inspecting the machine or making repairs.

The driven roller 16 which operates the shaft 53 by means of the pawl 82 revolves in opposite directions, the rotation of said roller being governed by the reversible sign sheet. The shaft 53 must be driven only in the direction previously described. When the roller 16 is driven in a direction opposite to that indicated by the arrow in Fig. XIV, the pawl 82 rides idly around the toothed collar 83, and other means for driving the shaft 53 are brought into service. The shaft 53 is reversely rotated by a train of gearing which comprises a gear wheel 104 secured to the end of the roller 16, (see Figs. V, VII and XI) gear wheels 105, 106 and 107 supported by the frame 3, and the gear wheel 108 loosely mounted on the shaft 53. The gear 108, which now revolves in a direction opposite to that indicated by the arrows in Fig. XV, carries a spring pressed drive pawl 109 which coöperates with a toothed collar 110, the latter being rigidly secured to the shaft 53.

In addition to the stop lugs 52ª and 93 which cause the various movable parts to stop in their normal positions, I also provide a friction brake that is of service when the motor circuit is closed. The function of this brake is to relieve the mechanism of stresses which would occur if the machine were stopped suddenly. The motor is provided with a rigid field magnet 111, and a field magnet 112 pivoted at 113, to a base 114 (see Figs. VIII and XXI). A band 115 is secured to a rigid pin 116 and adapted to frictionally engage a ring 117 on the armature C'. A slidable plate 118 mounted on guide blocks 119 is secured to the free end of the band 115. 120 indicates a bracket fastened to the pivoted field magnet 112, and having a threaded portion through which a screw 121 passes. A spring 122 is interposed between the screw 121 and the flange 118ª on plate 118. When the motor circuit is opened, the spring 122 forces the magnet 112 away from the armature (see Fig. XXI) and at the same time moves the sliding plate 118 to the left, thereby forcing the band 115 into frictional engagement with the ring 117. A lever 123, pivoted at 124 to a stationary plate 125, engages the slidable plate 118 and has its upper end pivotally connected to the bracket 120.

When the magnets are energized, the pivoted magnet 112 moves toward the armature, thereby causing the bracket 120 and the lever 123 to move in the direction indicated by arrows in Fig. XXI. This operation of lever 123 moves the plate 118 and the band 115 in the direction indicated by the arrows and releases the friction band from the ring 117.

In Fig. XXIII, I have shown the housing D provided with display openings 126, 127, 128 and 129. The sign sheet is provided with advertising signs which appear at the openings 126 and 127. In this modified form, the sign sheet may have four different sets of street signs, and in this event the hinged closures 130 will be positioned so that only one set of said signs will be displayed.

I claim:

1. An indicator comprising a winding spool, a supply spool, a sign sheet mounted on said spools, a shaft rotatable in unison with said sign sheet, a revoluble switch, a spring yieldingly connecting said switch directly to said shaft, an electric motor for operating said members, said motor being controlled by the revoluble switch, and a movable stop retaining said switch in its normal position.

2. An indicator comprising a winding spool, a supply spool, a sign sheet mounted on said spools, a shaft rotatable in unison with said sign sheet, a revoluble switch, a spring connecting said switch and shaft, an electric motor for operating said members, said motor being controlled by the revoluble switch, a movable stop retaining said switch in its normal position, an armature connected to said stop, an electro-magnet coöperating with said armature, and means for automatically controlling said magnet.

3. An indicator comprising a winding spool, a supply spool, a sign sheet mounted on said spools, a shaft rotatable in unison with said sign sheet, a revoluble switch, a spring connecting said switch and shaft, an electric motor for operating said members, said motor being controlled by the revoluble switch, a movable stop retaining said switch in its normal position, an armature connected to said stop, an electro-magnet coöperating with said armature, and means for automatically controlling said magnet; said last named means comprising an electric switch carried by a trolley pole and adapted to be operated by means arranged along the route traversed by a car provided with the indicator.

4. An indicator comprising a movable sign sheet, an electric motor for operating said sign sheet, a revoluble switch arranged in the motor energizing circuit, a spring tending to revolve said switch, a movable stop which normally locks said switch against rotation, an armature connected with said stop, an electromagnet for operating said armature, circuit closing devices for operating said electromagnet intermittently so as to release the switch and thereby cause the motor to operate, a brake for controlling the armature of said motor, a magnetically operated member for releasing said brake when the armature of the motor is placed in action, a stop for locking said switch in its closed position, a cam for releasing the said last mentioned stop, said cam being driven by the means for operating the sign sheet.

5. An indicator comprising a movable sign sheet, an electric motor for operating said sign sheet, a revoluble switch arranged in the motor energizing circuit, a spring tending to revolve said switch, a movable stop which normally locks said switch against rotation, means for operating said stop intermittently so as to release the switch and thereby cause the motor to operate, a stop for locking said switch in its closed position, and means for releasing the last mentioned stop, said means being operated by the motor.

6. An indicator comprising a movable sign sheet, an electric motor for operating said sign sheet, a revoluble switch arranged in the motor energizing circuit, a spring tending to revolve said switch, a movable stop which normally locks said switch against rotation, means for operating said stop intermittently so as to release the switch and thereby cause the motor to operate, a stop for locking said switch in its closed position, and a cam for releasing the last mentioned stop, said cam being driven by the means for operating the sign sheet.

7. An indicator comprising a movable sign sheet, an electric motor for operating said sign sheet, a revoluble switch arranged in the motor energizing circuit, a spring tending to revolve said switch, a movable stop which normally locks said switch against rotation, means for operating said stop intermittently so as to release the switch and thereby cause the motor to operate, a stop for locking said switch in its closed position, and a cam for releasing the last mentioned stop, a roller operated by the sign sheet, and means for connecting said cam and roller.

8. An indicator comprising a movable sign sheet, an electric motor for operating said sign sheet, a revoluble switch arranged in the motor energizing circuit, a spring tending to revolve said switch, a movable stop which normally locks said switch against rotation, means for operating said stop intermittently so as to release the switch and thereby cause the motor to operate, a shaft connected to said spring, means for revolving said shaft, means for stopping said switch in its closed position, the last mentioned means being effective while the shaft is revolving, and means for again releasing the switch so as to allow the spring to restore it to normal position.

9. An indicator comprising a sign sheet movable in opposite directions, an electric motor for operating said sign sheet, a revoluble switch arranged in the motor energizing circuit, a spiral spring connected to said switch, a revoluble shaft connected to said spring, a movable stop which normally locks said switch against rotation, means for operating said stop intermittently so as to release the switch and thereby cause the motor to operate, a roller movable in unison with said sign sheet, said shaft being connected to said roller so as to partake of the movements thereof, and means for causing said shaft to revolve in one direction only.

10. An indicator comprising a sign sheet movable in opposite directions, an electric motor for operating said sign sheet, a revoluble switch arranged in the motor energizing circuit, a spring connected to said switch, a shaft connected to said spring, a movable stop which normally locks said switch against rotation, means for operating said stop intermittently so as to release the switch and thereby cause the motor to operate, a roller movable in unison with said sign sheet, and means for connecting said shaft and roller so as to cause the shaft to rotate in one direction only, said means comprising two sets of mechanism for causing the shaft to partake of the movement of the roller, only one of said sets of mechanism being effective when the roller is operating.

11. An indicator comprising a sign sheet movable in opposite directions, an electric motor for operating said sign sheet, a revoluble switch arranged in the motor energizing circuit, a spring connected to said switch, a shaft connected to said spring, a movable stop which normally locks said switch against rotation, means for operating said stop intermittently so as to release the switch and thereby cause the motor to operate, a roller movable in unison with said sign sheet, and means for causing the shaft to operate in one direction only, said means comprising two sets of mechanism for causing the shaft to partake of the movements of said roller, only one of said sets of mechanism being effective when the roller is operated.

12. An indicator comprising a sign sheet movable in opposite directions, an electric motor for operating said sign sheet, a revoluble switch arranged in the motor energizing circuit, a spring connected to said switch, a shaft connected to said spring, a movable stop which normally locks said switch against rotation, means for operating said stop intermittently so as to release the switch and thereby cause the motor to operate, a roller movable in unison with said sign sheet, and means for causing the shaft to operate in one direction only, said means comprising two toothed members secured to the shaft, and pawls which coöperate therewith, said pawls being operated by the roller.

13. An indicator comprising a movable sign sheet, an electric motor for operating said sign sheet, a revoluble switch arranged in the motor energizing circuit, a spring tending to revolve said switch, a movable stop which normally locks said switch against rotation, an armature connected with said stop, an electromagnet adapted to operate said armature, means for intermittently energizing said electromagnet so as to operate said stop thereby releasing the switch and causing the motor to operate, a shaft connected with said spring, means for revolving said shaft, means for stopping said switch in its closed position, the last mentioned means being effective while the shaft is revolving, and means for again releasing the switch so as to allow the spring to restore it to its normal position.

HERMAN ALWIES.

In the presence of—
M. C. HUMMOR,
E. B. LINN.